United States Patent
Kosbab et al.

(10) Patent No.: US 7,958,190 B2
(45) Date of Patent: Jun. 7, 2011

(54) METHOD AND APPARATUS OF END-USER RESPONSE TIME DETERMINATION FOR BOTH TCP AND NON-TCP PROTOCOLS

(75) Inventors: Bruce Kosbab, Colorado Springs, CO (US); Dan Prescott, Colorado Springs, CO (US); Doug Roberts, McDonough, GA (US)

(73) Assignee: Fluke Corporation, Everett, WA (US)

( * ) Notice: Subject to any disclaimer, the term of this patent is extended or adjusted under 35 U.S.C. 154(b) by 27 days.

(21) Appl. No.: 12/241,932

(22) Filed: Sep. 30, 2008

(65) Prior Publication Data

US 2009/0228585 A1    Sep. 10, 2009

Related U.S. Application Data

(60) Provisional application No. 61/034,923, filed on Mar. 7, 2008.

(51) Int. Cl.
*G06F 15/16* (2006.01)
(52) U.S. Cl. .......................... 709/203; 709/230
(58) Field of Classification Search .................. 709/217, 709/219, 227, 232, 234, 230, 203
See application file for complete search history.

(56) References Cited

U.S. PATENT DOCUMENTS

| | | | |
|---|---|---|---|
| 5,937,165 A * | 8/1999 | Schwaller et al. | 709/224 |
| 6,108,700 A * | 8/2000 | Maccabee et al. | 709/224 |
| 6,178,449 B1 * | 1/2001 | Forman et al. | 709/224 |
| 6,272,539 B1 | 8/2001 | Cuomo et al. | |
| 6,446,028 B1 | 9/2002 | Wang | |
| 6,917,971 B1 | 7/2005 | Klein | |
| 7,006,448 B1 | 2/2006 | Thio | |
| 2002/0120727 A1 | 8/2002 | Curley et al. | |
| 2003/0172145 A1* | 9/2003 | Nguyen | 709/223 |
| 2003/0225549 A1* | 12/2003 | Shay et al. | 702/182 |
| 2006/0064483 A1 | 3/2006 | Patel | |
| 2007/0011317 A1* | 1/2007 | Brandyburg et al. | 709/224 |
| 2007/0299965 A1* | 12/2007 | Nieh et al. | 709/224 |
| 2008/0049641 A1* | 2/2008 | Edwards et al. | 370/253 |

FOREIGN PATENT DOCUMENTS

EP      1681799 A1      7/2006

* cited by examiner

*Primary Examiner* — Frantz B Jean
(74) *Attorney, Agent, or Firm* — patenttm.us

(57) ABSTRACT

End-user response time in a network is determined by an analyzer which measures client data transfer time, server response time, server data transfer time and, if the protocol is a TCP protocol, further measuring server network round trip time. End-user response time may be approximated by the sum of these determined times.

14 Claims, 4 Drawing Sheets

METHOD AND APPARATUS OF END-USER RESPONSE TIME DETERMINATION FOR BOTH TCP AND NON-TCP PROTOCOLS

CROSS-REFERENCE TO RELATED APPLICATIONS

This application claims priority of U.S. provisional patent application 61/034,923, filed Mar. 7, 2008, entitled METHOD AND APPARATUS OF END-USER RESPONSE TIME DETERMINATION FOR BOTH TCP AND NON-TCP PROTOCOLS.

BACKGROUND OF THE INVENTION

This invention relates to network test and measurement, and more particularly to an apparatus and method of determining end-user response time in network operation.

In installation, operation and maintenance of networks, determination of where issues or problem points arise can be complex. A network engineer or technician looking to resolve problems would be interested in determining the timing of interaction of clients on the network with a server, to help determine where problems might be occurring.

Applications that are request/response based, but do not use TCP as the transport protocol, are susceptible to issues with application, server, and/or network responsiveness in similar ways as applications that use TCP as the transport protocol.

However, heretofore, measurement of client/server response time for non-TCP protocols was not available. The TCP protocol provides reliability of data transfer and therefore request/response determination and specifically the beginning and end of the request/response can be determined based on the transport protocol. There are limitations in this regard with a non-TCP transport protocol.

Being able to determine the timing of interaction of clients on the network with a server would be helpful when troubleshooting network problems.

SUMMARY OF THE INVENTION

In accordance with the invention, end-user response time is determined for both TCP and non-TCP protocols.

Accordingly, it is an object of the present invention to provide an improved method and apparatus for network test and measurement.

It is a further object of the present invention to provide an improved method and apparatus for determining application transactions for non-TCP protocols on a network.

It is yet another object of the present invention to provide an improved method and apparatus to characterize timing of non-TCP protocol traffic on a network.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a method and apparatus to determine end user response time in TCP and non-TCP networking protocols.

In accordance with the present apparatus and method, end user response time can be employed as an approximate of client side response time for a network transaction, which can be used in determining where issues or performance problems might be occurring on the network.

Figure 1:
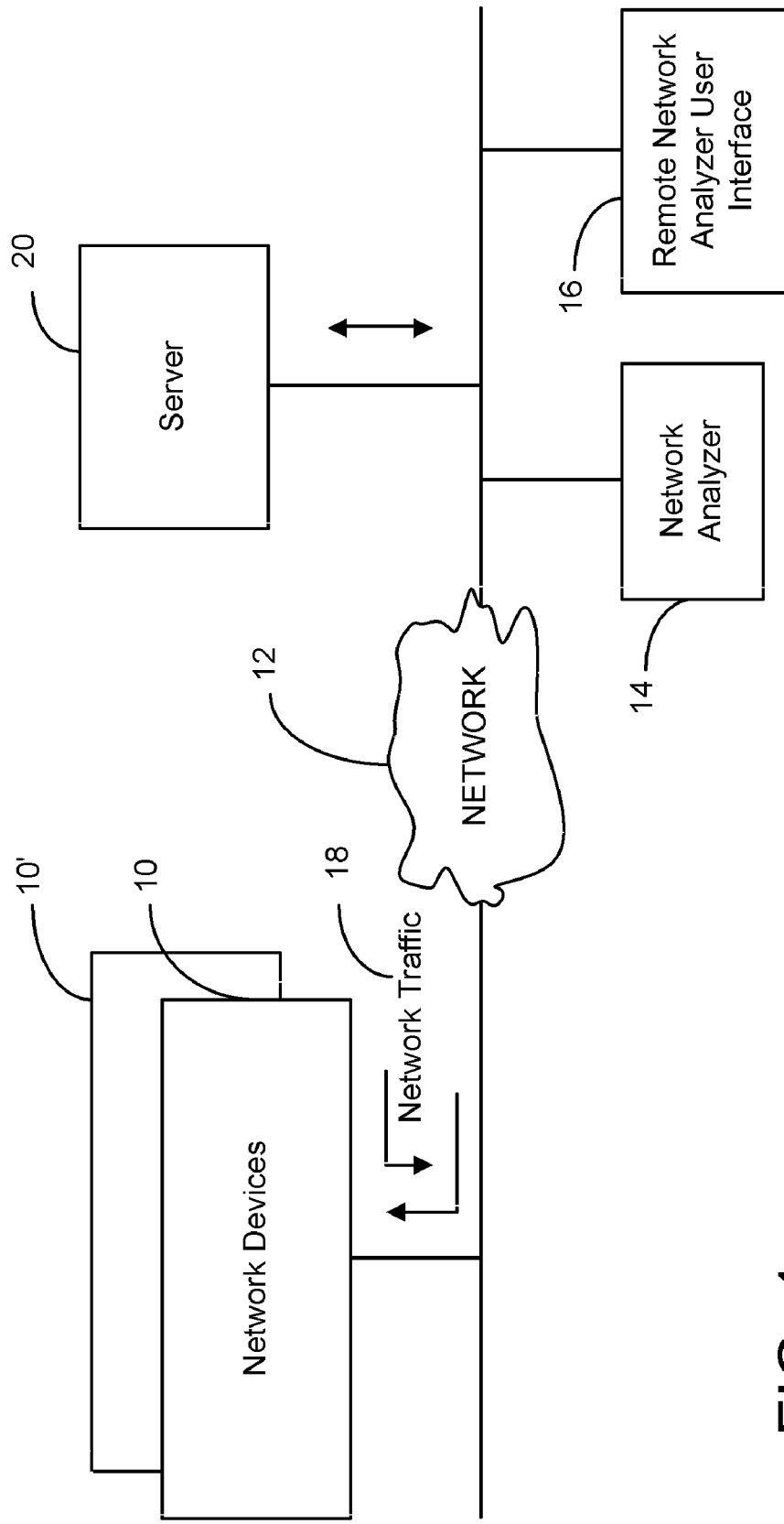
FIG. 1 is a block diagram of a network with a test instrument installed thereon.

Referring to FIG. 1, a block diagram of a network with an apparatus in accordance with the disclosure herein, a network may comprise plural network devices 10, 10', etc., which communicate over a network 12 by sending and receiving network traffic 18. The traffic may be sent in packet form, with varying protocols and formatting thereof.

A network analyzer 14 is also connected to the network, and may include a remote network analyzer interface 16 that enables a user to interact with the network analyzer to operate the analyzer and obtain data therefrom remotely from the physical location of the analyzer. In the illustration of FIG. 1, the analyzer is attached to the network near a server 20, which may be interacting with the various network devices 10, 10', etc., which can be considered clients in the current explanation.

The network analyzer comprises hardware and software, CPU, memory, interfaces and the like to operate to connect to and monitor traffic on the network, as well as performing various testing and measurement operations, transmitting and receiving data and the like. The remote network analyzer typically is operated by running on a computer or workstation interfaced with the network.

Figure 2:
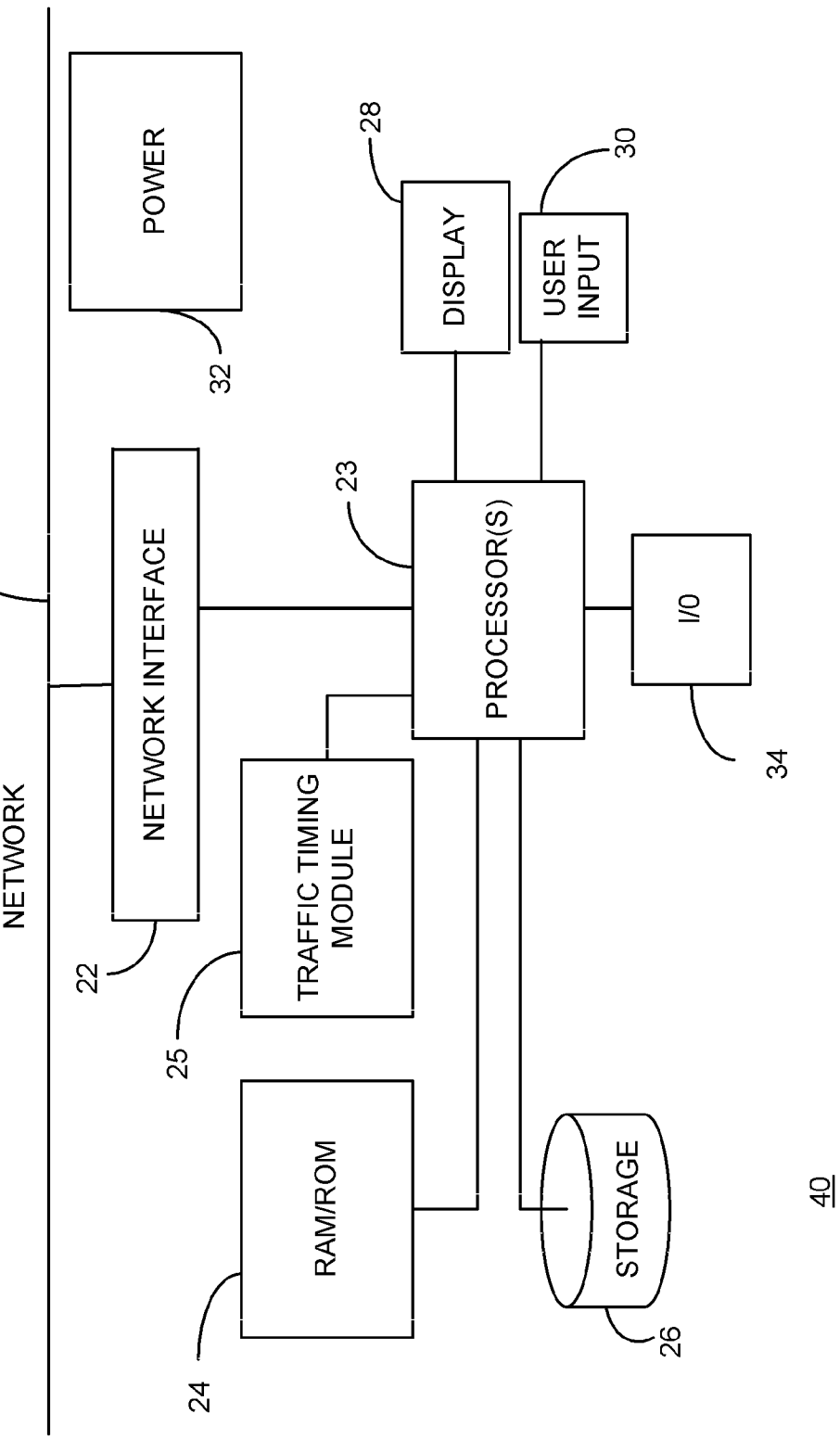
FIG. 2 is a block diagram of a test instrument.

FIG. 2 is a block diagram of a test instrument/analyzer 40, wherein the instrument may include network interface 22 which attaches the device to a network 12, one or more processors 23 for operating the instrument, memory such as RAM/ROM 24 or persistent storage 26, display 28, user input devices 30 (such as, for example, keyboard, mouse or other pointing devices, touch screen, etc.), power supply 32 which may include battery or AC power supplies, other interface 34 which attaches the device to a network or other external devices (storage, other computer, etc.). Traffic timing module 25, implemented in hardware or software, for example, provides timing of network traffic as discussed in conjunction with FIG. 4.

In operation, the network test instrument is attached to the network, near a server in the illustration of FIG. 1, although the test instrument can be attached elsewhere, such as near the client or other location, depending on the network behavior that is being observed or measured by a technician.

Figure 3:
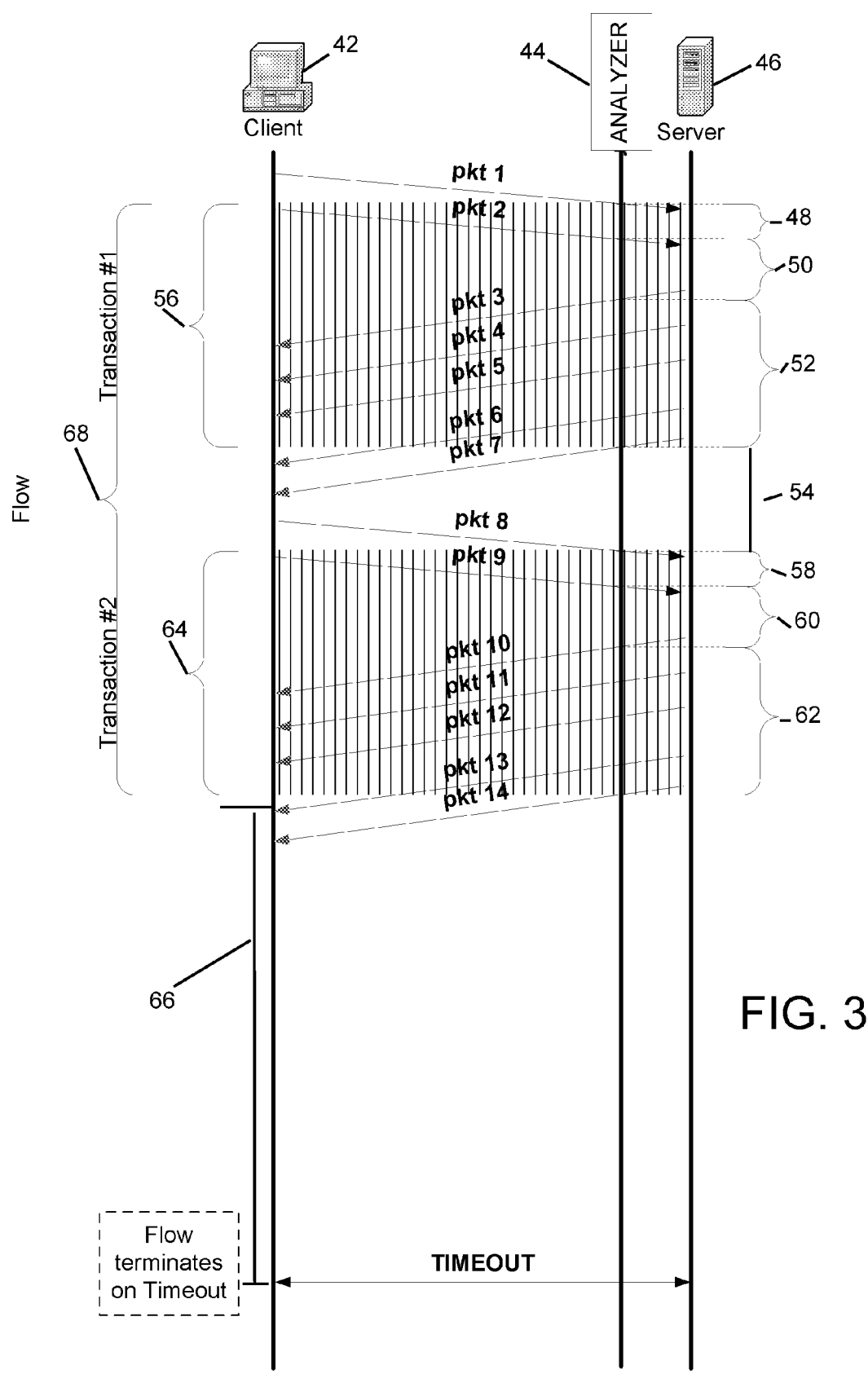
FIG. 3 is a representation of timing between a client and a server on a network for determining transactions.

Referring now to FIG. 3, a representation of and example of timing between a client and a server on a network and the analysis thereof in accordance with the method and apparatus, a client 42, which may be a computer or device on the network, analyzer 44, and server 46 are all represented on the network. In the particular configuration shown, the analyzer 44 is placed near the server 46 to provide measurements closest to the server location. The client begins transmitting data during time 48, pkt1, pkt2, followed by a pause in transmission, indicated by time passage 50. The time passage 50 is sufficiently long that it is recognized as a break in the transmission of data from client 42, whereupon the server 46 transmits data on the network back to the client during time 52, pkt3, pkt4, pkt5, pkt6, pkt7. The server then stops transmitting in time block 54, and the exchange of data between the client and server is thereby recognized as a first transaction 56, denoted Transaction #1 in FIG. 3.

Next, client 42 begins another transmission, pkt8 and pkt9 during time period 58, followed by a quiet time period 60 which is interpreted as the end of the client's present transmission. The server then sends response pkt10, pkt11, pkt12, pkt13, pkt14 during time period 62, and upon cessation of that set of transmissions by the server, the analyzer 44 determines that the current client/server transaction 64 has been completed, denoted Transaction #2 in FIG. 3.

After a timeout period 66, it is determined that the communication (flow) 68 between client and server has terminated.

The various timing measurements are observed by analyzer 44 and may be recorded for use in network test and measurement operations.

Figure 4:
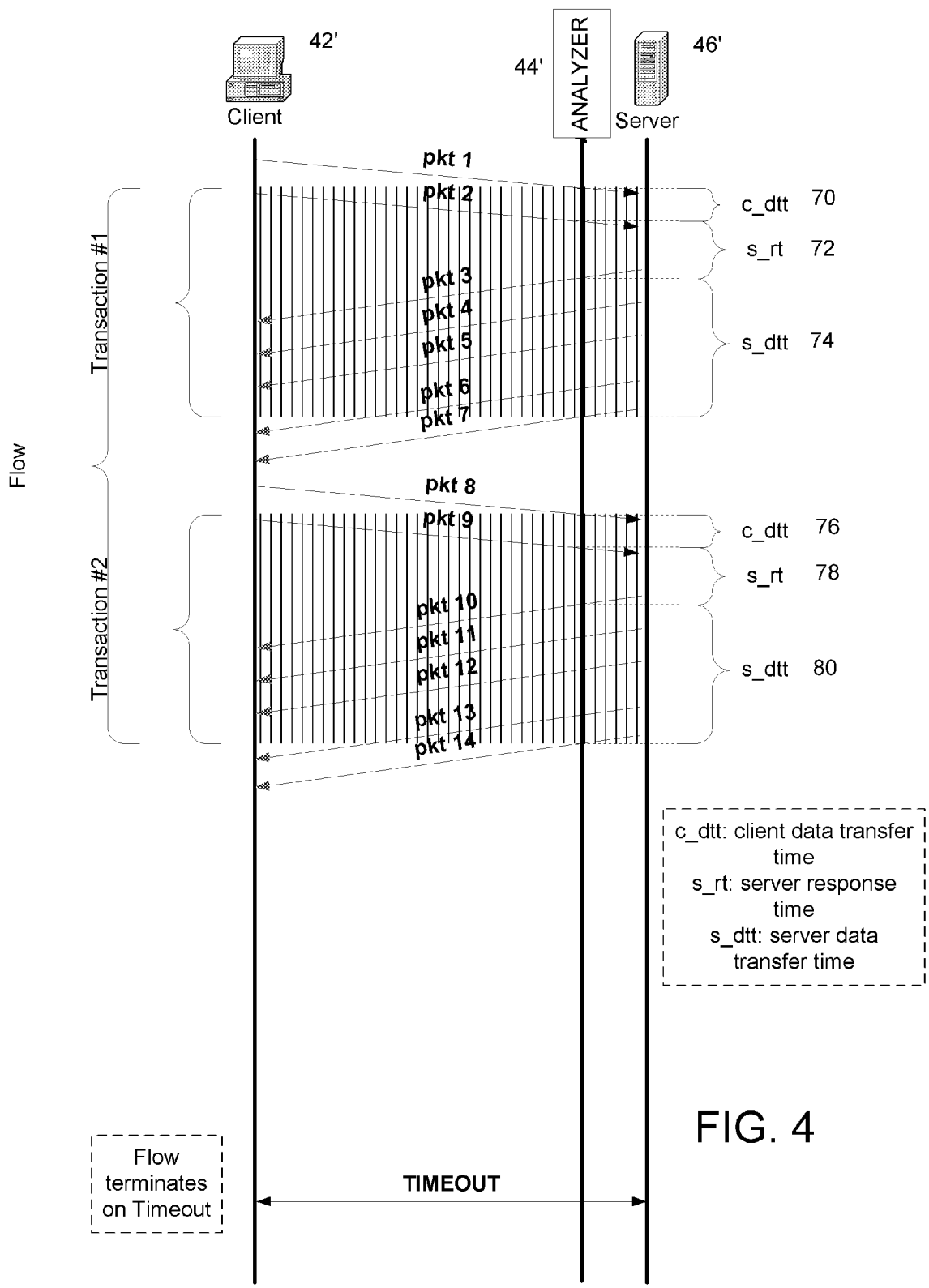
FIG. 4 is a representation of timing measurements between a client and a server on a network for determining end-user response time.

Referring to FIG. 4, in operation, the test instrument 44' is connected to the network and observes network traffic, identifying clients 42' and servers 46' that are operating and sending traffic on the network.

For an individual flow (communication between a client and server), the apparatus and method tracks the first packet and last packet from the client as well as the first and last packet from the server. A single transaction is determined to be all sequential packets from the clients followed by all sequential packets from the server. Once a server packet is seen, the next client packet marks the beginning of a new transaction.

The analyzer 44' is configured such that a number of default protocols are recognized, analyzed, and classified as streaming or non-streaming. Further, a user can specify a custom protocol or default protocol on a non-standard port that is to be recognized, analyzed, and classified as streaming or non-streaming, since users may operate protocols on non-standard ports.

The test instrument observes network traffic and the method and apparatus herein considers four particular aspects of the timing of non-streaming network traffic:

c_dtt: client data transfer time=the time delta from the first client packet and the last client packet s_rt: server response time=the time delta from the last client packet and the first server packet s_dtt: server data transfer time=the time delta from the first server packet and the last server packet s_nrt: server network round trip (TCP-only), the time delta from a server packet and the TCP acknowledgment for that packet In a particular embodiment, the following portions of end user response time are typically displayable to a technician for assisting with analysis of the network behavior:

Application Response Time (s_rt)
Data Transfer Time (c_dtt+s_dtt)
Network Round Trip (s_nrt)

The sum of the four measurements, (s_rt+c_dtt+s_dtt+s_nrt in the case of TCP protocols, three measurements s_rt+c_dtt+s_dtt for non-TCP protocols) provides an end user response time value, which can be employed by the technician in observing network behavior to attempt troubleshooting or adjustment of network operations.

FIG. 4 graphically illustrates non-TCP protocol analysis in accordance with the present invention.

Client 42' is illustrated at one position on a network, while analyzer 44' is positioned near server 46'. In the illustrated example, transaction #1 is determined to be pkt1, pkt2 from client 42' to server 46' and pkt3, pkt4, pkt5, pkt6 and pkt7 from server 46' to client 42'. The timing of the client traffic of transaction #1 transfer time c_dtt 70 is measured as the time between the first recognition by analyzer 44' of pkt1 from client 42' and the time of the recognition of pkt2 from client 42'. The time 72 between pkt2 and the recognition by analyzer 44' of pkt3 from server 46 is server response time, s_rt. The time 74 from the recognition by analyzer 44' of pkt3 from server 46' and the last sequential packet pkt7 from server 46' is server data transfer time 74, s_dtt.

With the end of sequential transmissions from server 46' to client 42', the analyzer 44' knows that Transaction #1 is complete. The end-user response time for Transaction #1 may be computed as s_rt 72+c_dtt 70+s_dtt 74 for non-TCP protocol examples as shown in FIG. 4. If the protocol was TCP, then an additional value Network Round Trip (s_nrt) would be available, which is determined by the analyzer as the time delta from the server packet (pkt4 in the FIG. 4 example, if this were a TCP protocol exchange being illustrated) and the acknowledgment (ACK) from the client for that packet (not illustrated in this example, but would come from client 42' to server 46' after client 42' received pkt4), and would be included as part of the end-user response time determination.

Continuing with the example of FIG. 4, the next transmission from client 42', pkt8, is then recognized by the analyzer 44' to be a new transaction, Transaction #2 in the illustrated example, which ultimately comprises pkt8, pkt9, pkt10, pkt11, pkt12, pkt13, and pkt14.

The timing of the client traffic of transaction #2 transfer time c_dtt 76 is measured as the time between the first recognition by analyzer 44' of pkt8 from client 42' and the time of the recognition of pkt9 from client 42'. The time 78 between pkt9 and the recognition by analyzer 44' of pkt10 from server 46' is server response time, s_rt. The time 80 from the recognition by analyzer 44' of pkt10 from server 46' and the last sequential packet pkt14 from server 46' is server data transfer time 80, s_dtt, for Transaction #2.

Again, with the end of sequential transmissions from server 46' to client 42' at pkt14, the analyzer 44' determines that Transaction #2 is complete. The end-user response time for Transaction #2 may be computed as s_rt 78+c_dtt 76+s_dtt 80 for non-TCP protocol examples as shown in FIG. 4. Again, if the protocol was TCP, then an additional value Network Round Trip (s_nrt) would be available and would be included as part of the end-user response time determination.

The various timing measurements can be accomplished by traffic timing module 25 (FIG. 2), whether implemented as hardware/firmware/software or a combination thereof. The timing module observes the start and end of traffic which is then used to compute the various noted values based on determination of that further sequential traffic or timeout having occurred.

Being able to determine the end-user response time can be advantageous, as it can minimize the number of network monitoring devices that would be needed to monitor and detect application response problems and determine the cause of those problems.

The determined values may be provided to a network technician, displayed, whether locally or remotely (for example via remote user interface 16), stored and accumulated for statistics generation, to assist the technician in maintaining and repairing network operation.

Thus, in accordance with the method and apparatus, the analyzer determines network traffic timing and provides an approximation of end-user response time.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for determining end-user response time on a network in both TCP and non-TCP protocols, comprising:
    determining client data transfer time;
    determining server response time;
    determining server data transfer time;
    if the protocol is a TCP protocol, further determining server network round trip time; and
    computing end-user response time, based on the determined client data transfer time, server response time and server data transfer time, and, if the protocol is a TCP protocol, the server network round trip time.

2. The method according to claim 1, wherein client data transfer time is determined as the time between a beginning of data transfer from a client, and the end of a data transfer from the client.

3. The method according to claim 1, wherein server response time is determined as the time between the end of data transfer from a client, and the start of a data transfer from a server.

4. The method according to claim 1, wherein server data transfer time is determined as the time between the beginning of data transfer from a server, and the end of a data transfer from the server.

5. The method according to claim 1, wherein server network round trip time is determined as the time between a data packet from the server and the TCP acknowledgement from the client for that packet.

6. The method according to claim 1, wherein computing end-user response time comprises adding the determined client data transfer time, server response time and server data transfer time, and, if the protocol is a TCP protocol, further adding the server network round trip time.

7. The method according to claim 1, wherein computing end-user response time comprises adding the determined client data transfer time, server response time and server data transfer time,
    wherein client data transfer time is determined as the time between a beginning of data transfer from a client, and the end of a data transfer from the client,
    wherein server response time is determined as the time between the end of data transfer from a client, and the start of a data transfer from a server, and
    wherein server data transfer time is determined as the time between the beginning of data transfer from a server, and the end of a data transfer from the server, and
    wherein computing end-user response time comprises adding the determined client data transfer time, server response time and server data transfer time, and, if the protocol is a TCP protocol, further adding the server network round trip time.

8. An apparatus for determining end-user response time for both TCP and non-TCP protocol traffic on a network, comprising:
    a network interface for connecting to and observing traffic on a network;
    a processor;
    a storage medium for storing data;
    wherein said processor performs traffic timing to determine client data transfer time, determine server response time, determine server data transfer time, if the protocol is a TCP protocol further determining server network round trip time, and,
    wherein said processor computes end-user response time, based on the determined client data transfer time, server response time and server data transfer time, and, if the protocol is a TCP protocol, the server network round trip time.

9. The apparatus according to claim 8, wherein client data transfer time is determined as the time between a beginning of data transfer from a client, and the end of a data transfer from the client.

10. The apparatus according to claim 8, wherein server response time is determined as the time between the end of data transfer from a client, and the start of a data transfer from a server.

11. The apparatus according to claim 8, wherein server data transfer time is determined as the time between the beginning of data transfer from a server, and the end of a data transfer from the server.

12. The apparatus according to claim 8, wherein server network round trip time is determined as the time between a data packet from the server and the TCP acknowledgement from the client for that packet.

13. The apparatus according to claim 8, wherein computing end-user response time comprises adding the determined client data transfer time, server response time and server data transfer time, and, if the protocol is a TCP protocol, further adding the server network round trip time.

14. The apparatus according to claim 8, wherein client data transfer time is determined as the time between a beginning of data transfer from a client, and the end of a data transfer from the client,
    wherein server response time is determined as the time between the end of data transfer from a client, and the start of a data transfer from a server, and
    wherein server data transfer time is determined as the time between the beginning of data transfer from a server, and the end of a data transfer from the server, and
    wherein computing end-user response time comprises adding the determined client data transfer time, server response time and server data transfer time, and, if the protocol is a TCP protocol, further adding the server network round trip time.

* * * * *